United States Patent
An

(10) Patent No.: US 9,520,106 B2
(45) Date of Patent: Dec. 13, 2016

(54) MULTI-VIEW AUTOSTEREOSCOPIC IMAGE DISPLAY AND METHOD OF CONTROLLING OPTIMAL VIEWING DISTANCE THEREOF

(71) Applicant: LG DISPLAY CO., LTD., Seoul (KR)

(72) Inventor: Cheunghwan An, Seoul (KR)

(73) Assignee: LG DISPLAY CO., LTD., Seoul (KR)

( * ) Notice: Subject to any disclaimer, the term of this patent is extended or adjusted under 35 U.S.C. 154(b) by 167 days.

(21) Appl. No.: 13/722,099

(22) Filed: Dec. 20, 2012

(65) Prior Publication Data

US 2014/0091991 A1 Apr. 3, 2014

(30) Foreign Application Priority Data

Sep. 28, 2012 (KR) .................. 10-2012-0108794

(51) Int. Cl.
*G09G 5/14* (2006.01)
*H04N 13/04* (2006.01)

(52) U.S. Cl.
CPC ............ *G09G 5/14* (2013.01); *H04N 13/0404* (2013.01); *H04N 13/0409* (2013.01); *H04N 13/0447* (2013.01); *H04N 13/0475* (2013.01); *H04N 13/0422* (2013.01)

(58) Field of Classification Search
CPC ............ H04N 13/0003; H04N 13/0007; H04N 13/0011; H04N 13/0014; H04N 13/0278; H04N 13/0282; H04N 13/0404; H04N 13/0447; H04N 13/0475; H04N 13/0409; H04N 3/0404; H04N 3/0409; H04N 3/0447; H04N 3/0475; H04N 3/0477; H04N 3/0479; G02B 27/02; G02B 27/22; G02B 27/26; G02B 27/2207; G02B 27/2214; G02B 27/2264; G09G 5/14; G02F 1/1335
See application file for complete search history.

(56) References Cited

U.S. PATENT DOCUMENTS

| 8,760,396 | B2 * | 6/2014 | Kim et al. ................. 345/156 |
| 9,024,983 | B2 | 5/2015 | An et al. |
| 2006/0227427 | A1 * | 10/2006 | Dolgoff ..................... 359/619 |
| 2011/0242442 | A1 | 10/2011 | Lee et al. |
| 2011/0261169 | A1 * | 10/2011 | Tin ............................. 348/51 |

(Continued)

FOREIGN PATENT DOCUMENTS

| KR | 10-2011-0045654 A | 5/2011 |
| KR | 10-2012-0014433 A | 2/2012 |

*Primary Examiner* — Jonathan Boyd
*Assistant Examiner* — Sardis F Azongha
(74) *Attorney, Agent, or Firm* — Birch, Stewart, Kolasch & Birch, LLP

(57) ABSTRACT

A multi-view autostereoscopic image display and a method of controlling an optimal viewing distance thereof are provided. The multi-view autostereoscopic image display includes a display panel displaying multi-view image data, a display panel driver writing the multi-view image data, a 3D optical element separating the optical axes of the multi-view image data, a viewing distance sensing unit sensing the positions of both eyes of a viewer, and a viewing distance extension controller that detects viewing zones where both eyes of the viewer are located by comparing the positions of both eyes of the viewer with positional information of predefined viewing zones, and selectively converts at least some of the multi-view image data according to a change in the positions of the viewing zones where both eyes of the viewer are located.

16 Claims, 28 Drawing Sheets

(56) References Cited

U.S. PATENT DOCUMENTS

2011/0285700 A1* 11/2011 Kim et al. .................... 345/419
2011/0316881 A1* 12/2011 Yoshifuji et al. ............. 345/634
2012/0032952 A1    2/2012 Lee et al.
2012/0154556 A1    6/2012 An et al.
2012/0194510 A1*  8/2012 Yun ......................... G02B 3/06
                                                    345/419
2012/0299985 A1* 11/2012 Ichihashi et al. ............. 345/691

* cited by examiner

| R | G | B | R | G | B | R | G | B | R | G | B | R | G | B | R | G | B | R | G | B |
|---|---|---|---|---|---|---|---|---|---|---|---|---|---|---|---|---|---|---|---|---|
| 1 | 2 | 3 | 4 | 1 | 2 | 3 | 4 | 1 | 2 | 3 | 4 | 1 | 2 | 3 | 4 | 1 | 2 | 3 | 4 | |
| 4 | 1 | 2 | 3 | 4 | 1 | 2 | 3 | 4 | 1 | 2 | 3 | 4 | 1 | 2 | 3 | 4 | 1 | 2 | 3 | |
| 3 | 4 | 1 | 2 | 3 | 4 | 1 | 2 | 3 | 4 | 1 | 2 | 3 | 4 | 1 | 2 | 3 | 4 | 1 | 2 | |
| 2 | 3 | 4 | 1 | 2 | 3 | 4 | 1 | 2 | 3 | 4 | 1 | 2 | 3 | 4 | 1 | 2 | 3 | 4 | 1 | |
| 1 | 2 | 3 | 4 | 1 | 2 | 3 | 4 | 1 | 2 | 3 | 4 | 1 | 2 | 3 | 4 | 1 | 2 | 3 | 4 | |
| 4 | 1 | 2 | 3 | 4 | 1 | 2 | 3 | 4 | 1 | 2 | 3 | 4 | 1 | 2 | 3 | 4 | 1 | 2 | 3 | |
| 3 | 4 | 1 | 2 | 3 | 4 | 1 | 2 | 3 | 4 | 1 | 2 | 3 | 4 | 1 | 2 | 3 | 4 | 1 | 2 | |
| 2 | 3 | 4 | 1 | 2 | 3 | 4 | 1 | 2 | 3 | 4 | 1 | 2 | 3 | 4 | 1 | 2 | 3 | 4 | 1 | |

100

IMAGE REQUIRING RE2 COMPENSATION

IMAGE REQUIRING LE2 COMPENSATION

OVERLAY AREA IS GENERATED

IMAGE PERCEIVED BY RE2

IMAGE PERCEIVED BY LE2

POSSIBLE CROSSTALK AREA

PIXELS PERCEIVED BY RE2

PIXELS PERCEIVED BY LE2

IMAGE PERCEIVED BY RE2

IMAGE REQUIRING RE2 COMPENSATION

IMAGE PERCEIVED BY LE2

LE2 COMPENSATION IS NOT REQUIRED

PIXELS PERCEIVED BY RE2

PIXELS PERCEIVED BY LE2

MULTI-VIEW AUTOSTEREOSCOPIC IMAGE DISPLAY AND METHOD OF CONTROLLING OPTIMAL VIEWING DISTANCE THEREOF

This application claims the priority benefit of Korean Patent Application No. 10-2012-0108794 filed on Sep. 28, 2012, which is incorporated herein by reference for all purposes as if fully set forth herein.

BACKGROUND OF THE INVENTION

Field of the Invention

This document relates to a multi-view autostereoscopic image display and a method of controlling an optimal viewing distance thereof.

Discussion of the Related Art

As the stereoscopic image reproduction technology is applied to display devices, such as a television or a monitor, now is the age in which people can view 3D stereoscopic images even at home. A stereoscopic image display can be divided into a glasses type and an autostereoscopic type. The glasses type display can display left and right parallax images on a direct-view display or projector by changing polarization direction thereof or by a time-divisional manner, and implement a stereoscopic image using polarization glasses or liquid-crystal shutter glasses. In the autostereoscopic type, optical elements can be installed in front of or behind a display screen. The optical elements can include a parallax barrier for separating the optical axes of left and right parallax images, and a lenticular lens (hereinafter "lens").

In the autostereoscopic image display, as shown in FIG. 1, an optimal viewing distance OVD from which a viewer can properly view a stereoscopic image is calculated based on the back length between a pixel array PIX of a display panel and a lens LENS, the focal length of the lens LENS, a pixel pitch Ppix, a lens pitch Plens, and the distance between the left and right eyes of the viewer. In FIG. 1, the back length, the focal length of the lens LENS, the pixel pitch Ppix, the lens pitch Plens, and the distance between the left and right eyes of the viewer is fixed to constant values. The distance between the left and right eyes of the viewer is 65 mm for average adults. Therefore, the optimal viewing distance OVD for the autostereoscopic image display is fixed to a specific position, as shown in FIG. 1. Even when the autostereoscopic image display has a barrier, instead of the lens of FIG. 1, the optimal viewing distance OVD is fixed to a specific position.

In FIG. 1, "REZ" denotes a right-eye viewing zone where pixels with a right-eye image written therein (hereinafter, "right-eye pixels") R can be seen, and "LEZ" denotes a left-eye viewing zone where pixels with a left-eye image written therein (hereinafter, "left-eye pixels") L can be seen. "PSUBS" is a transparent substrate for securing the back length between the pixel array PIX and the lens LENS.

If the viewer moves forward or backward from the optimal viewing distance OVD, one eye (right eye or left eye) of the viewer sees both the left-eye pixels and the right-eye pixels, making the viewer feel 3D crosstalk. The autostereoscopic image display can be implemented as a multi-view system. In the multi-view system, a multi-view image is written in the pixel array PIX to enable the viewer to see a stereoscopic image at different positions from the optimal viewing distance OVD. In such a multi-view system, if the viewer moves forward or backward from the optimal viewing distance OVD, view images seen through one eye of the viewer are doubled, thus making the viewer feel 3D crosstalk.

SUMMARY OF THE INVENTION

In order to address the above mentioned drawbacks and other limitations associated with the related art, one purpose of the present invention is to provide a multi-view autostereoscopic image display capable of extending optimal viewing distance from which a stereoscopic image can be properly viewed and a method of controlling an optimal viewing distance thereof.

One example of a multi-view autostereoscopic image display according to the present invention includes a display panel for displaying multi-view image data; a display panel driver for writing the multi-view image data; a 3D optical element separating the optical axes of the multi-view image data; a viewing distance sensing unit sensing the positions of both eyes of a viewer; and a viewing distance extension controller that detects viewing zones where both eyes of the viewer are located by comparing the positions of both eyes of the viewer with positional information of predefined viewing zones, and selectively converts at least some of the multi-view image data according to a change in the positions of the viewing zones where both eyes of the viewer are located.

One example of a method of controlling an optimal viewing distance of the multi-view autostereoscopic image display according to the present invention includes sensing the positions of both eyes of a viewer; detecting viewing zones where both eyes of the viewer are located by comparing the positions of both eyes of the viewer with positional information of predefined viewing zones; and selectively converting at least some of the multi-view image data according to a change in the positions of the viewing zones where both eyes of the viewer are located.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE INVENTION

Figure 1:
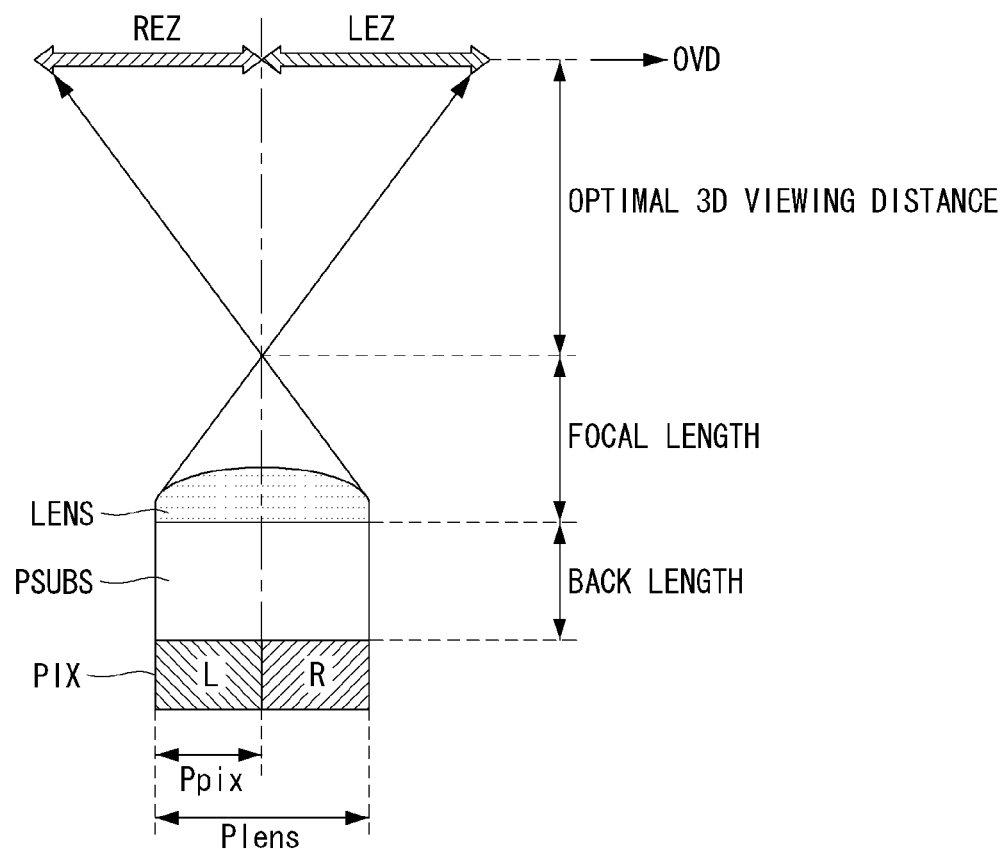
FIG. 1 is a view showing an optimal viewing distance of an autostereoscopic image display according to related art.

Hereinafter, exemplary embodiments of the present invention will be described with reference to the drawings. Throughout the specification, like reference numerals denote substantially like components.

Before describing the embodiments of this invention, the terms used herein will be defined.

The multi-view autostereoscopic image display of the present invention can be implemented using various types of displays, including a flat panel display such as a liquid crystal display (LCD), a field emission display (FED), a plasma display panel (PDP), an organic light emitting diode (OLED), and an electrophoresis EPD. The multi-view autostereoscopic display can display 2D image data in the 2D mode and 3D image data in the 3D mode. The 3D optical element in the multi-view autostereoscopic image display can be bonded onto a display panel of the multi-view autostereoscopic image display.

The 3D optical element can be an optical element that separates sub-pixels seen through the viewer's left eye and sub-pixels seen through the viewer's right eye. The 3D optical element can be an optical element, such as a barrier or a lens. The barrier and the lens may be implemented as a switchable barrier and a switchable lens, respectively, which can be electrically controlled by using a liquid crystal panel. Commonly owned U.S. patent application Ser. No. 13/077,565 (U.S. Publication No. 2011/0242442) and U.S. patent application Ser. No. 13/325,272 (U.S. Publication No. 2012/0154556), respectively illustrate a switchable barrier and a switchable lens.

Figure 2:
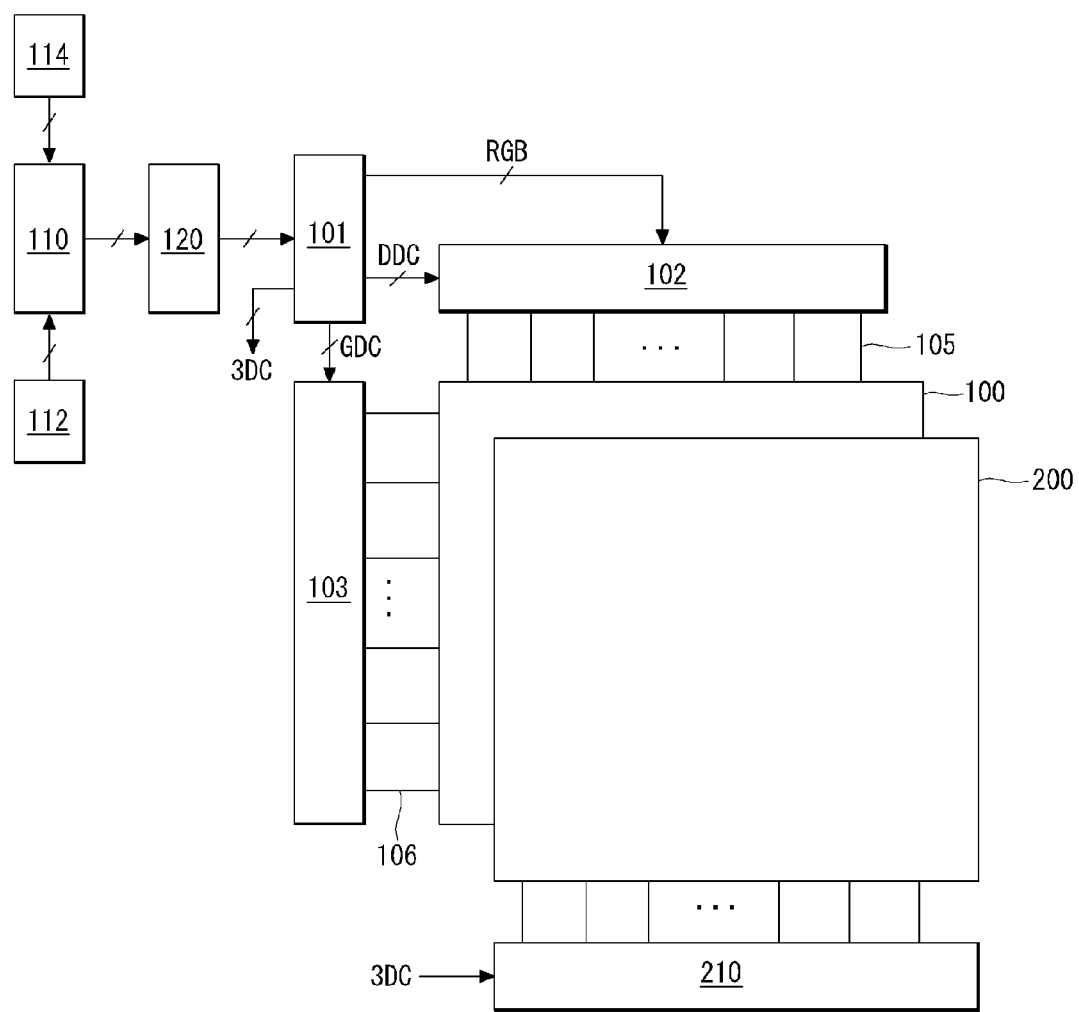
FIG. 2 is a block diagram showing a multi-view autostereoscopic image display according to an exemplary embodiment of the present invention.
Figure 3:
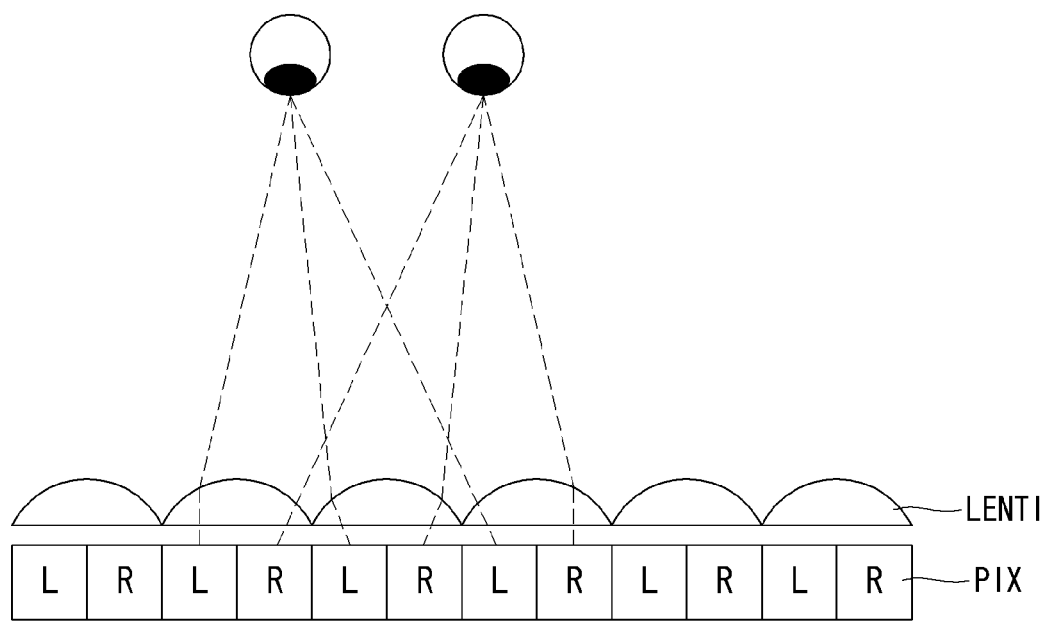
FIG. 3 is a cross-sectional view showing a lens of the multi-view autostereoscopic image display.
Figure 4:
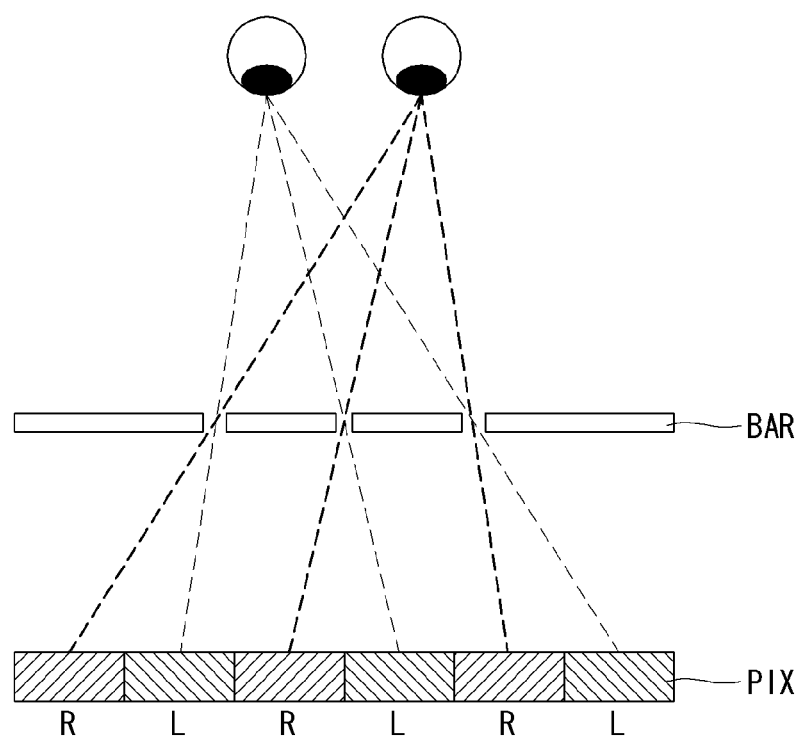
FIG. 4 is a cross-sectional view showing a barrier of the multi-view stereoscopic image display.

Referring to FIGS. 2 to 4, one embodiment of the multi-view autostereoscopic image display of the present invention includes a display panel 100, a display panel driver, a 3D optical element 200, a 3D optical element driver 210, a host system 110, a user interface 112, a viewing distance sensing unit 114, and a timing controller 101.

The display panel 100 includes a pixel array PIX in which data lines 105 and gate lines (or scan lines) 106 cross each other and pixels are disposed in a matrix form. Each of the pixels can include subpixels of different colors. The pixel array displays a 2D image in the 2D mode and displays a left-eye image and a right-eye image in the 3D mode. The user interface 112 receives user data input and switches the operation mode of the autostereoscopic image display between a 2D mode operation and a 3D mode operation. The host system 110 or the timing controller 101 receives digital data from the viewing distance sensing unit 114. The timing controller 101 supplies digital video data to the data driving circuit 102.

The display panel driver includes a data driving circuit 102 for supplying data voltages of 2D and 3D images to the data lines 105 of the display panel 100 and a gate driving circuit 103 for sequentially supplying scan pulses (or gate pulses) to the scan lines 106 of the display panel 100. In the 3D mode, the display panel driver spatially distributes and writes left-eye and right-eye image data input in accordance with a multi-view image data format into the pixels of the display panel 100.

The data driving circuit 102 converts digital video data input from the timing controller 101 into an analog gamma voltage to generate data voltages, and supplies the data voltages to the data lines 105 of the display panel 100. The gate driving circuit 103 supplies the gate pulses (or scan pulses) synchronized with the data voltages supplied to the data lines 105 to the gate lines 106 under control of the timing controller 101, and sequentially shifts the scan pulses. The multi-view autostereoscopic image display preferably includes one or more of the components 100, 101, 102, 103, 110, 112, 114, 120, and 200, 210, and all the components of the device are operatively coupled and configured.

The 3D optical element 200 can be implemented as a lens LENTI or barrier BAR, as shown in FIGS. 3 to 7. For example, 3D optical element 200 can be bonded to the front or back of the display panel 100, or it can be embedded in the display panel 100 to separate the optical axes of left-eye image data and right-eye image data of 3D image data. The switchable barrier BAR or switchable lens LENS can include a birefringence medium such as liquid crystal, and it can be electrically driven by the 3D optical element driver 210 to separate the optical axes of light of left-eye and right-eye images.

Figure 5:
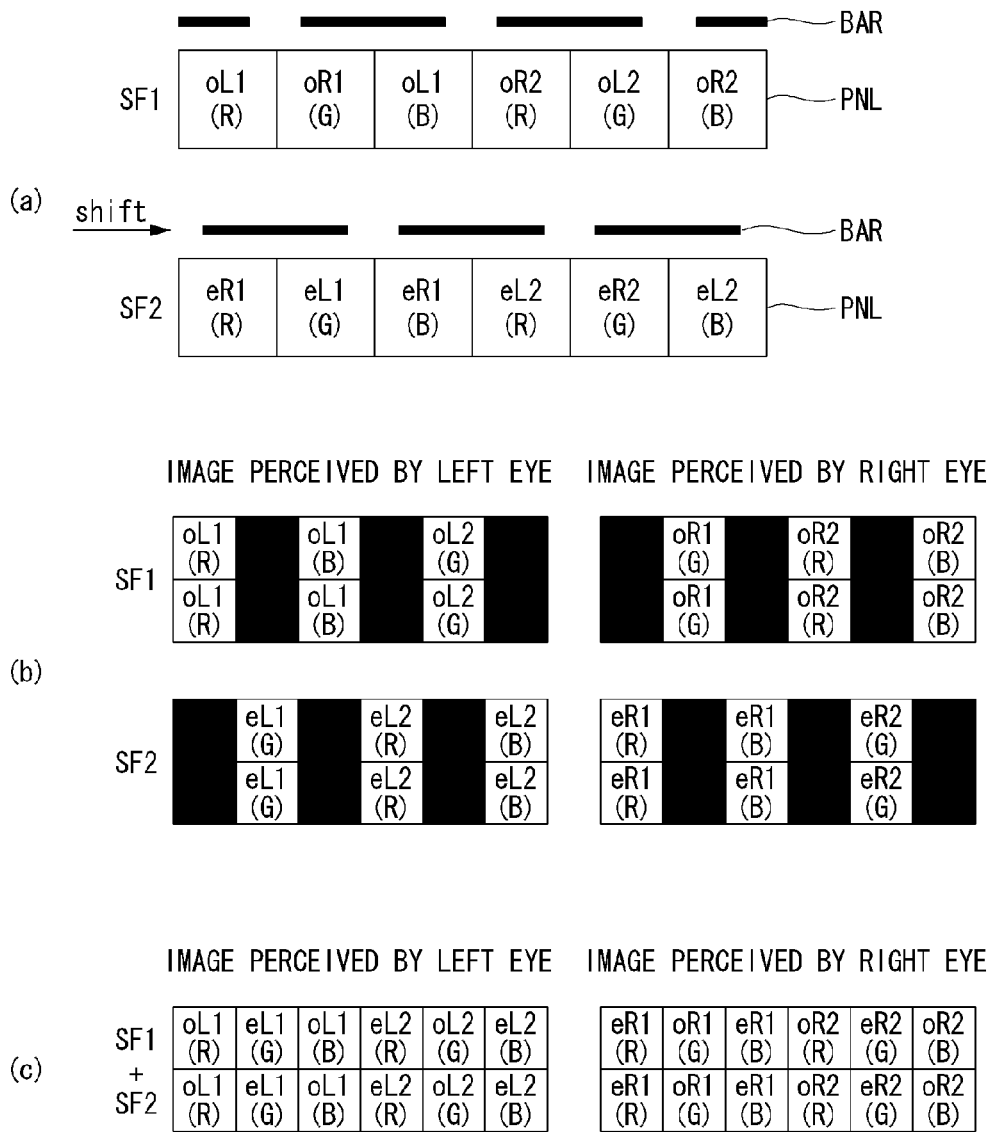
FIGS. 5 and 6 are views showing an example of a method of driving the multi-view autostereoscopic image display to display a stereoscopic image without resolution loss by using a switchable lens or a switchable barrier.
Figure 6:
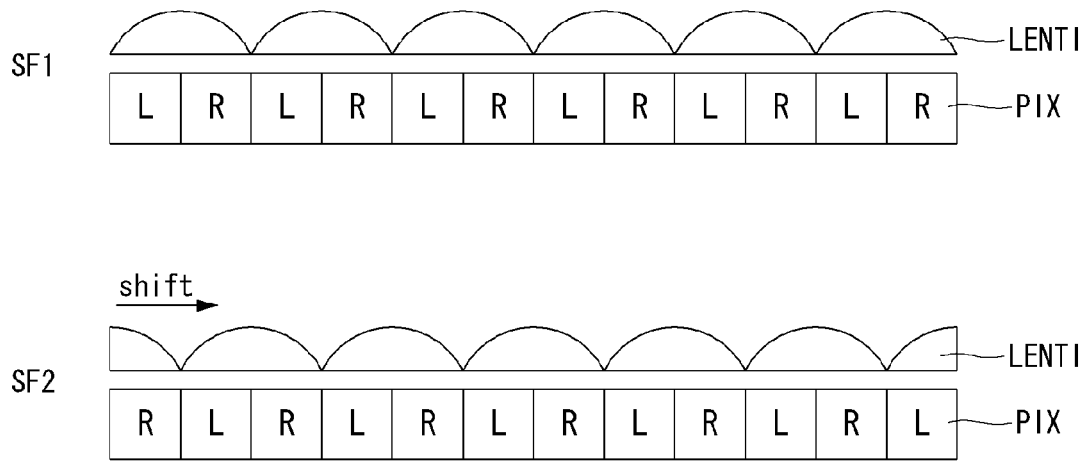

The 3D optical element driver 210 is synchronized with pixel data written in the pixel array of the display panel 100 in the 3D mode under control of the timing controller 101 to shift the switchable barrier BAR or switchable lens LENTI, as shown in FIGS. 5 and 6.

The viewing distance sensing unit 114 senses the distance of the viewer and the positions of both eyes of the viewer by using a sensor, converts a sensing result into digital data, and supplies the digital data to a host system 110 or the timing controller 101. The sensor can be an image sensor such as a camera, an infrared sensor, and a radio frequency sensor, or other image sensors as known. The viewing distance sensing unit 114 can analyze two sensor outputs by triangulation, calculate the distance between the display panel 100 and the viewer, and transmit a calculation result to the host system 110 or the timing controller 101. The viewing distance sensing unit 114 can analyze a sensor output through a well-known face recognition algorithm, sense the positions of both eyes of the viewer, and transmit a sensing result to the host system 110 or the timing controller 101.

The timing controller 101 supplies digital video data RGB of a 2D/3D input image input from the host system 110 to the data driving circuit 102. Also, the timing controller 101 receives timing signals such as a vertical synchronization signal, a horizontal synchronization signal, a data enable signal, and a main clock, input from the host system 110 in synchronization with the digital video data of the 2D/3D input image. The timing controller 101 generates timing control signals for controlling operation timings of the display panel driver 102 and 103 and the 3D optical element driver 210 by using the timing signals and controlling the operation timings of these drivers to be synchronized with each other.

The timing controller 101 can control operation timings of the driving circuits 102 and 103, and the 3D optical element driver 210 at a frame rate of (input frame frequency×N) Hz (N is a positive integer equal to or greater than 2), which is obtained by multiplying an input frame frequency N times. The frame rate of the input image is 60 Hz for NTSC (National Television Standards Committee) and 50 Hz for PAL (Phase-Alternating Line).

A 3D data formatter 120 can be installed between the host system 110 and the timing controller 101. The 3D data formatter 120 realigns left-eye image data and right-eye image data of a 3D image input from the host system 110 in the 3D mode in accordance with the multi-view image data format shown in FIGS. 10A and 10B, and supplies it to the timing controller 101. When 2D image data is input in the 3D mode, the 3D data formatter 120 can execute a preset 2D-3D image conversion algorithm to generate left-eye image data and right-eye image data from the 2D image data, realign the data in accordance with the multi-view image data format shown in FIGS. 10A and 10B, and transmit it to the timing controller 101.

The host system 110 can be implemented as any of the following: a TV (television) system, a set-top box, a navigation system, a DVD player, a Blue-ray player, a personal computer (PC), a home theater system, a broadcast receiver, and a phone system, or other devices as known. The host system 110 uses a scaler to convert digital video data of a 2D/3D input image into a format appropriate for the resolution of the display panel PNL 100 and transmit a timing signal, along with the data, to the timing controller 101.

The host system 110 supplies a 2D image to the timing controller 101 in the 2D mode, and supplies a 3D or 2D image data to the 3D data formatter 120 in the 3D mode. The host system 110 can transmit a mode signal to the timing controller 101 in response to user data input through the user interface 112 to switch the operation mode of the autostereoscopic image display between a 2D mode operation and a 3D mode operation. The user interface 112 can be implemented as a keypad, a keyboard, a mouse, an on-screen display (OSD), a remote controller, a graphic user interface (GUI), a touch user interface (UI), a voice recognition UE, and a 3D UI, or other devices as known. The user can select between the 2D mode and the 3D mode through the user interface 112, and select 2D-3D image conversion in the 3D mode.

FIGS. 5 and 6 are views showing an example of a method of driving the autostereoscopic image display of the present invention to display a stereoscopic image without resolution loss by using a switchable lens or switchable barrier. As shown in FIGS. 5 and 6, one frame period is divided into first and second subframes SF1 and SF2. The switchable 3D optical element 300 can be electrically controlled to, for example, shift a switchable barrier BAR or a switchable lens LENTI by a predetermined distance every frame period (or every subframe period). The method of driving an autostereoscopic image display shifts a pixel data to be written in the pixel array PIX and the switchable barrier BAR or switchable lens LENTI synchronized with a pixel data shift timing, as shown in FIG. 5(*a*). FIG. 5(*b*) depicts a left-eye image and a right-eye image perceived by the viewer, which are separated by the switchable 3D optical element 200.

FIG. 5(*c*) depicts the left-eye image and the right-eye image perceived by the viewer and accumulated during one frame period. As can be seen from FIG. 5(*c*), an autostereoscopic image display can be implemented without resolution degradation by properly shifting the switchable 3D optical element 200 and the pixel data. In FIG. 5, oL1 and oL2 denote left-eye image data written in the pixels of the pixel array PIX during a first subframe SF1, and oR1 and oR2 denote right-eye image data written in the pixels of the pixel array PIX during the first subframe period. eL1 and eL2 denote left-eye image data written in the pixels of the pixel array PIX during a second subframe SF2, and eR1 and eR2 denote right-eye image data written in the pixels of the pixel array PIX during the second subframe period.

Figure 7:
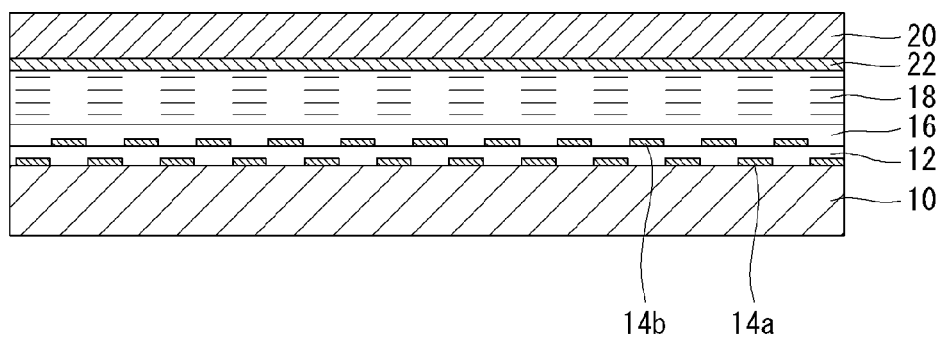
FIG. 7 is a cross-sectional view showing an example of a structure of a switchable lens according to an embodiment of the present invention.

FIG. 7 is a cross-sectional view showing an example of a structure of a switchable lens LENTI according to an embodiment of the present invention.

Referring to FIG. 7, the switchable lens can include a liquid crystal layer 18 formed between a lower substrate 10 and an upper substrate 20, separate lower electrodes 14a and 14b, and an upper electrode 22 formed on the upper substrate 20.

The lower substrate 10 and the upper substrate 20 can be made of a transparent material. In an example of a switchable barrier BAR, polarizers can be bonded to the lower substrate 10 and the upper substrate 20. The electrodes 14a, 14b, and 22 can be formed of a transparent electrode material such as indium tin oxide ITO. Other types of materials can also be used. The lower electrodes 14a and 14b can be separated into upper and lower layers by transparent insulation layers 12 and 16 in order to minimize the distance between electrode patterns and finely control liquid crystal molecules of the liquid crystal layer 18.

In one example, driving voltages applied to the lower electrodes 14a and 14b can be independently applied in accordance with a driving method of the switchable lens LENTI or switchable barrier BAR, and the voltages can differ from each other. In another example, the driving voltages applied to the lower electrodes 14a and 14b can also be shifted to shift the lens or barrier. The upper electrode 22 can be formed of a single layer over the entire upper substrate 20, and it can form an equivalent potential surface as it is applied with a common voltage.

Figure 8:
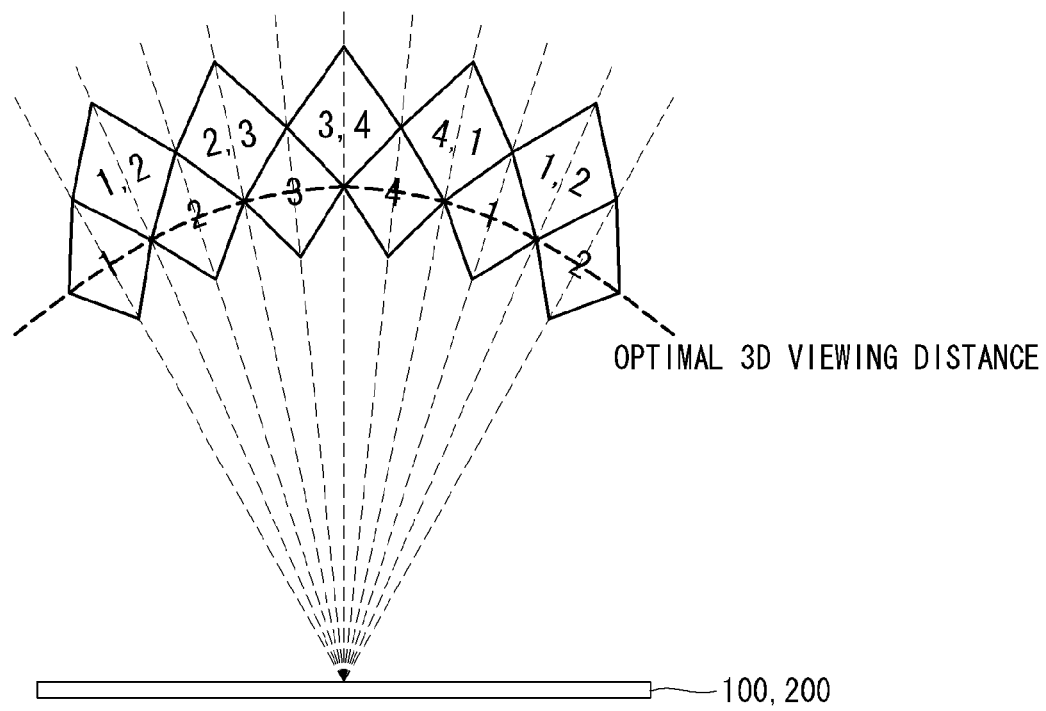
FIG. 8 is a view examples of showing viewing zones divided from a multi-view image viewing area in the multi-view autostereoscopic image display.

FIG. 8 depicts an example of the optimal viewing distance from which the viewer can properly view a stereoscopic image when multi-view image data is displayed on the pixel array PIX of the display panel 100. Although the example of FIG. 8 illustrates a multi-view image system displaying 4-view image data, the present invention is not limited thereto. For example, the multi-view autostereoscopic image display of the present invention can display N-views (N is a positive integer equal to or greater than 3).

In FIG. 8, diamond-shaped areas denote viewing zones. "1" denotes a viewing zone where a first view image displayed on the display panel 100 is seen, and "2" denotes a viewing zone where a second view image displayed on the display panel 100 is seen. "3" denotes a viewing zone where a third view image displayed on the display panel 100 is seen, and "4" denotes a viewing zone where a fourth view image displayed on the display panel 100 is seen. "1,2" denotes a viewing zone where both the second view image and the third view image are seen, and "2,3" denotes a viewing zone where both the second view image and the third view image are seen. "1,2", "2,3", "3,4", and "4,1" denote rear viewing zones located behind the optimal viewing distance. The first to fourth view images are image data respectively captured through four cameras spaced apart at binocular distances. Thus, the first view image and the second view image have binocular parallax which occurs when viewing the same object through two cameras spaced apart at a binocular distance.

The positions, size, and shape of the viewing zones can be pre-stored in a memory of a look-up table LUT in the timing controller 101 and/or the host system 110. The host system 110 or the timing controller 101 can determine which viewing zone the right eye RE and left eye LE of the viewer are located and determine the movement direction and movement distance of the viewer by comparing a position of the viewer sensed by the viewing distance sensing unit 114 with viewing zone position information of the look-up table. Also, the host system 110 or the timing controller 101 can serve as a viewing distance extension controller which controls the driving circuits of the display panel and converts at least some of multi-view image data into different view image data according to a change in the viewer's position.

In the conventional autostereoscopic image display, the rear viewing zones are such viewing zones where the viewer cannot view a normal stereoscopic image due to 3D crosstalk because multiple view images are seen by one eye of the viewer. On the other hand, the multi-view autostereoscopic image display of the present invention senses the position of a viewing zone where the viewer is located, and selectively converts multi-view image data according to the sensed position of the viewer, thus allowing the viewer to view a normal stereoscopic image at any position.

Figure 9:
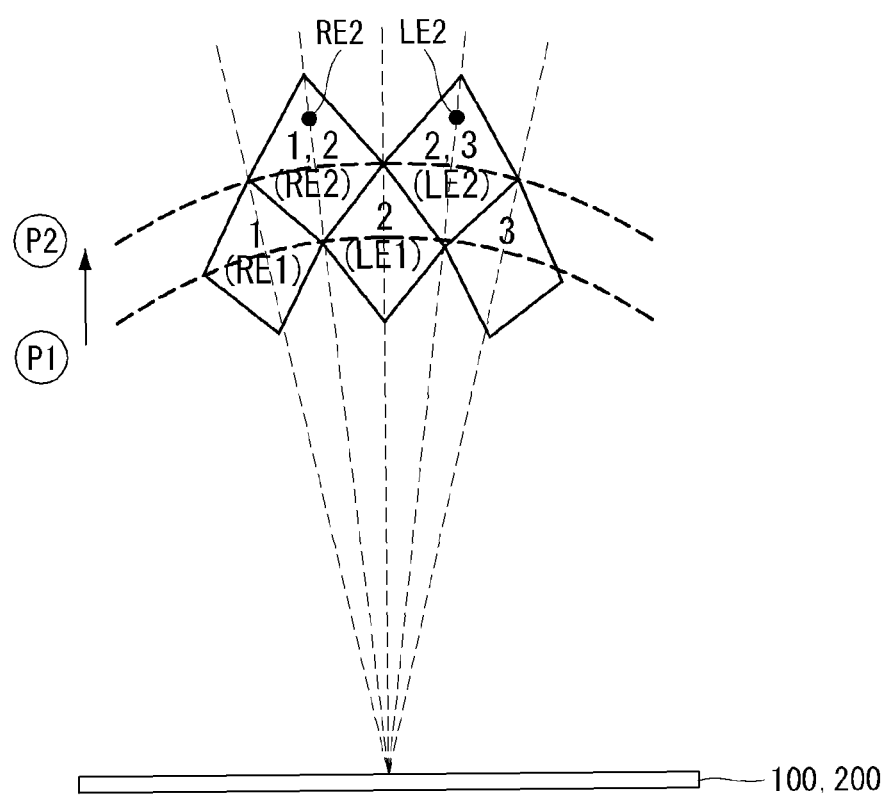
FIG. 9 is a view showing an example of viewing zones in the multi-view autostereoscopic image display for the left eye and right eye of the viewer when the viewer is located at position P1 and position P2.

FIG. 9 is a view showing an example of viewing zones where the left eye and right eye of the viewer are located when the viewer is at position P1 and position P2. In FIG. 9, "1(RE1)" denotes a first viewing zone where only a first view image is seen from an optimal viewing distance located along line P1, and the right eye RE1 of the viewer is located in the first viewing zone. "2(LE1)" denotes a second viewing zone where only a second view image is seen from the optimal viewing distance located along line P1, and the left eye LE1 of the viewer is located in the second viewing zone. "1,2(RE2)" denotes a first rear viewing zone located along line P2, where both the first view image and the second view image are seen, and the right eye RE2 of the viewer is located in the first rear viewing zone. "2,3(LE2)" is a second rear viewing zone located along line P2, where both the second view image and the third view image are seen, and the left eye LE2 of the viewer is located in the second rear viewing zone.

Figures 10A, 10B:
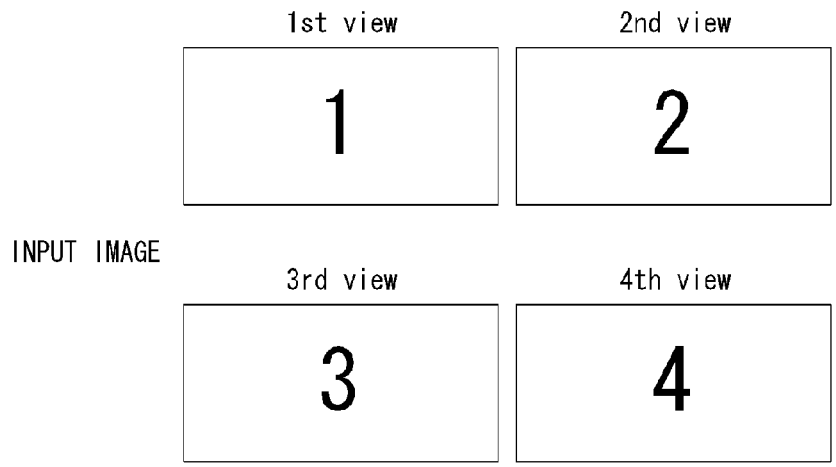
FIGS. 10A and 10B are examples of views schematically showing 4 view images written in the display panel in the multi-view autostereoscopic image display shown in FIG. 9.

FIGS. 10A and 10B are examples of views schematically showing 4 view images written in the display panel in the multi-view autostereoscopic image display shown in FIG. 9. FIG. 10B is an example of a top plan view showing the arrangement of 4 view images written in the pixel array of the display panel. RGB indicated at the top of FIG. 10B denotes the positions of RGB subpixels. In FIGS. 10A and 10B, "1" denotes a first view image, "2" denotes a second view image, "3" denotes a third view image, and "4" denotes a fourth view image. The lens LENTI or barrier BAR can be disposed along a diagonal direction of the display panel.

Figure 11A:
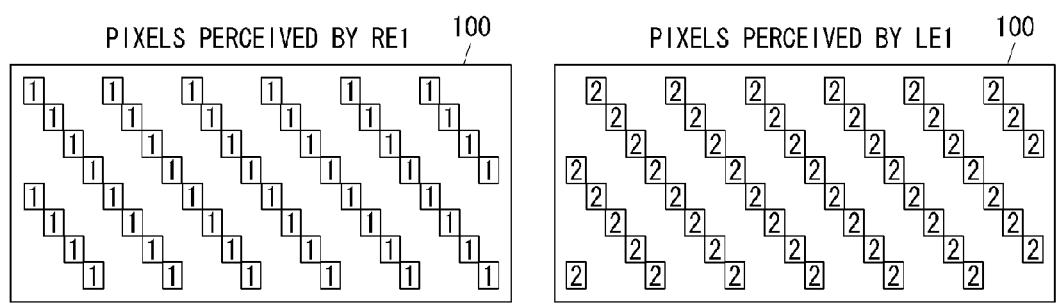
FIGS. 11A and 11B are examples of views showing a right-eye image and a left-eye image perceived by the viewer when the right eye and left eye of the viewer at position P1 of FIG. 9 are located in the first and second viewing zones.
Figure 11B:
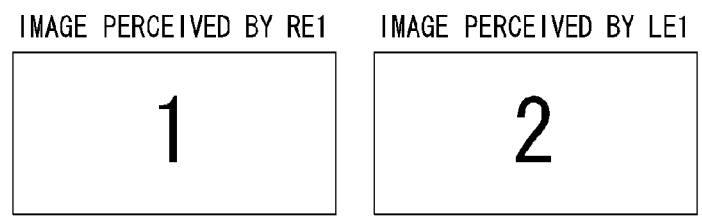

FIGS. 11A and 11B are examples of views showing a right-eye image and a left-eye image perceived by the viewer when the right eye and left eye of the viewer at position P1 of FIG. 9 are located in the first and second viewing zones. FIG. 11A is an example of a view showing pixels perceived by the right eye RE1 of the viewer and pixels perceived by the left eye LE1 of the viewer when the right eye and left eye of the viewer are respectively located in the first and second viewing zones 1(RE1) and 2(LE1). FIG. 11B is an example of a view showing a right-eye image and a left-eye image perceived by the viewer when the right eye RE1 and left eye LE1 of the viewer are respectively located in the first and second viewing zones 1(RE1) and 2(LE1). As shown in FIGS. 11A and 11B, if the viewer is at position P1 and the right eye RE1 and left eye LE1 of the viewer are located in the first and second viewing zones, the right eye RE1 of the viewer sees only the pixels displaying the first view image 1 and the left eye LE1 of the viewer sees only the pixels displaying the second view image 2. Accordingly, when the right eye RE1 and left eye LE1 of the viewer at position P1 are respectively located in the first and second viewing zones, the viewer can view a normal stereoscopic image without 3D crosstalk.

Figure 12A:
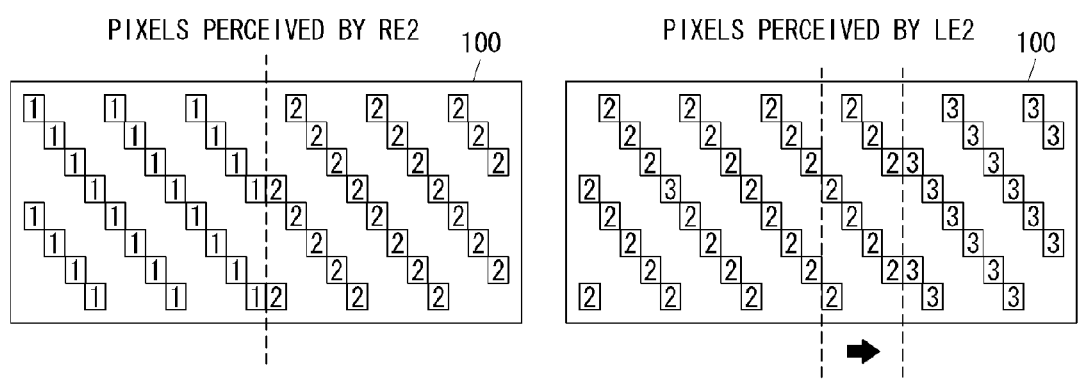
FIGS. 12A and 12B are examples of views showing a right-eye image and a left-eye image perceived by the viewer when the right eye and left eye of the viewer at position P2 of FIG. 9 are located in the first and second viewing zones.
Figure 12B:
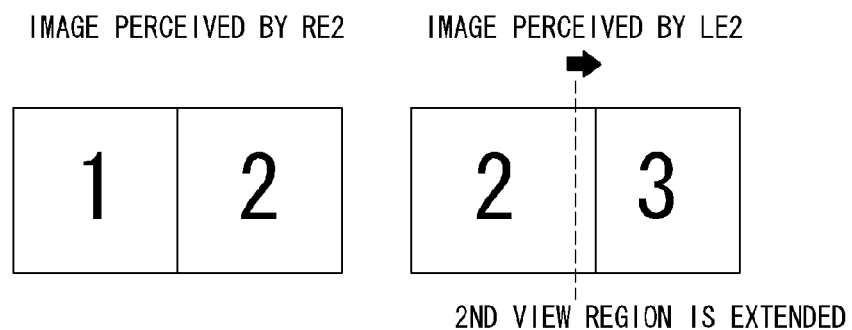

FIGS. 12A and 12B are examples of views showing a right-eye image and a left-eye image perceived by the viewer when the right eye and left eye of the viewer at position P2 of FIG. 9 are located in the first and second viewing zones. FIG. 12A is an example of a view showing pixels perceived by the right eye RE2 of the viewer and pixels perceived by the left eye LE2 of the viewer when the right eye RE2 and left eye LE2 of the viewer are respectively located in the first and second rear viewing zones 1,2(RE2) and 2,3(LE2). FIG. 12B is an example of a view showing images respectively perceived by the right and left eyes of the viewer when the right eye RE2 and left eye LE3 of the viewer are respectively located in the first and second rear viewing zones 1,2(RE2) and 2,3(LE2). If the viewer is at position P2 of FIG. 9 and the right eye RE2 and left eye LE2 of the viewer are located in the first and second rear viewing zones 1,2(RE2) and 2,3(LE2), the right eye RE1 of the viewer sees the pixels displaying both of the first and second view images 1 and 2 and the left eye LE1 of the viewer sees the pixels displaying both of the second and third view images 2 and 3. This is because the first and second rear viewing zones 1,2(RE2) and 2,3(LE2) have a larger size because their viewing distance is longer than the viewing distance of the viewing zones at position P1, and the optical path of the two view images passes through the first and second rear viewing zones 1,2(RE2) and 2,3(LE2). Accordingly, if the right eye RE2 and left eye LE2 of the viewer at position P2 are located in the first and second rear viewing zones 1,2(RE2) and 2,3(LE2), the viewer feels 3D crosstalk.

As illustrated in the example of viewing zones as shown in FIG. 9, the distance between the centers of the first and second rear viewing zones 1,2(RE2) and 2,3(LE2) is greater than the distance between the centers of the first and second viewing zones 1(RE1) and 2(LE1). Accordingly, if the right eye RE1 of the viewer is located at the center of the first rear viewing zone 1,2(RE2), then the left eye LE2 of the viewer is located further to the right from the center of the second rear viewing zone 2,3(LE2). In this case, the right eye RE2 of the viewer sees half of the first view image 1 and half of the second view image 2 from position P2. On the other hand, the left eye LE2 of the viewer sees more of the pixels displaying the second view image 2 than of the pixels displaying the third view image 3, as show in FIG. 12B.

In the multi-view autostereoscopic image display of the present invention, as illustrated in the example of viewing zones as shown in FIG. 9, when the viewer moves from P1 to P2 or moves to a position forward of P1, some of the view image data written in the pixel array of the display panel is converted into different view image data. As a result, the viewer can properly view a stereoscopic image without 3D crosstalk by the autostereoscopic image display even if he or she moves forward or backward from the display panel.

A method of controlling an optimal viewing distance of the multi-view autostereoscopic image display of the present invention can be, for example, divided into a method of extending the difference in view between the two eyes of the viewer (hereinafter, referred to as a "view extension method") and a method of maintaining the difference in view between the two eyes of the viewer (hereinafter, referred to as a "view maintaining method") of maintaining the difference in view between the two eyes of the viewer.

Figure 13:
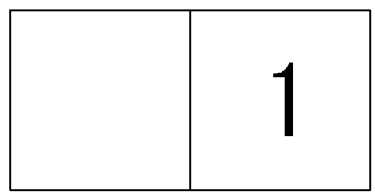
FIG. 13 is an example of a view showing compensation regions of images seen with the right eye and left eye of the viewer when the viewer is at position P2 in accordance with the view extension method.
Figure 13:
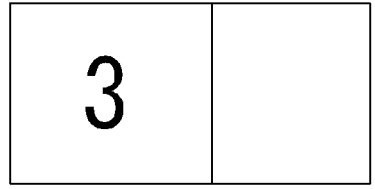
Figure 13:
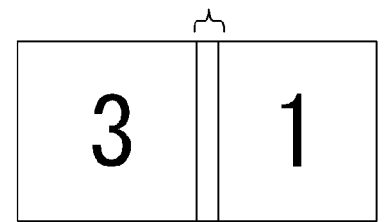
Figure 14:
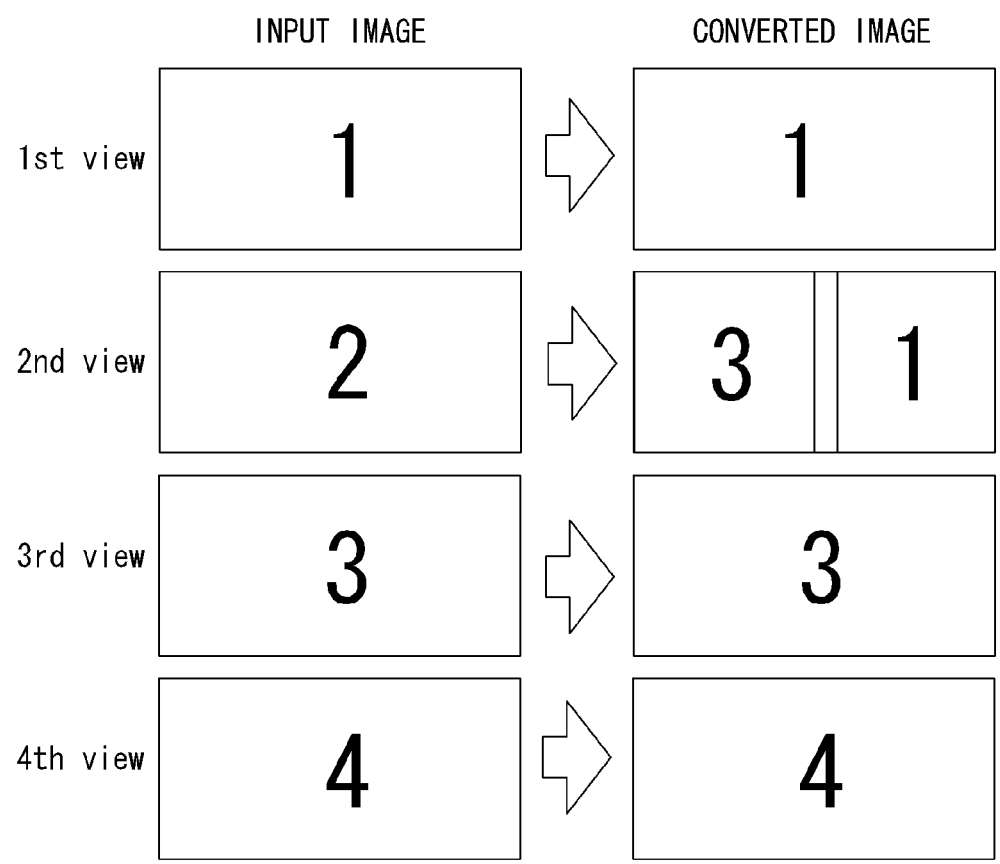
FIG. 14 is an example of a view showing both an input image and a converted image, as shown in FIGS. 10A and 10B, in accordance with the view extension method applied when the viewer is at position P2.
Figure 15:
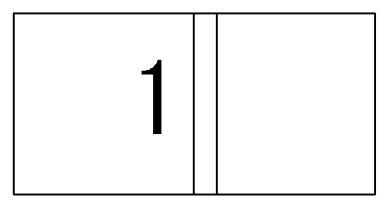
FIG. 15 is an example of a view showing a right-eye image and a left-eye image perceived by the viewer, which are obtained after view image data is converted by the view extension method of FIG. 14.
Figure 15:
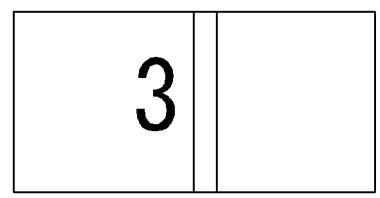

In view extension methods in related art, some of the view image data written in a display panel is converted into different view image data so that the difference between view images seen from a first position by both eyes of the viewer is greater than the difference between view images seen from a second position by both eyes of the viewer. On the contrary, according to the view extension method of the present invention as shown in FIG. 9, some of the view image data that is written in the display panel 100 is converted into different view image data so that the viewer sees only the first view image with the right eye RE2 and only the third view image with the left eye LE2 when he or she moves to P2. In addition, according to the view extension method as shown in FIGS. 13 to 15, when the viewer's position is shifted further from P1 to P2, a sense of depth of the stereoscopic image perceived by the viewer can be changed, and 3D crosstalk can be perceived in an overlay area of compensation regions where the pixels are converted. Therefore, the view extension method of the present invention substantially reduces the size of a possible 3D crosstalk area, as compared to view extension methods in related art.

As shown in the example of a view in FIG. 15, some of the view image data written in the display panel 100 is converted into different view image data so that the difference between view images seen from position P1 by both eyes of the viewer is maintained even when the viewer moves to position P2. In particular, some of the view image data, as shown in the examples of viewing zones in FIG. 9, is converted into different view image data so that the viewer sees only the first view image with the right eye RE2 and only the second view image with the left eye LE2. Thereby, a sense of depth of the stereoscopic image perceived by the viewer can be maintained regardless of the viewer's position, and the stereoscopic image can be displayed without 3D crosstalk.

Figure 16:
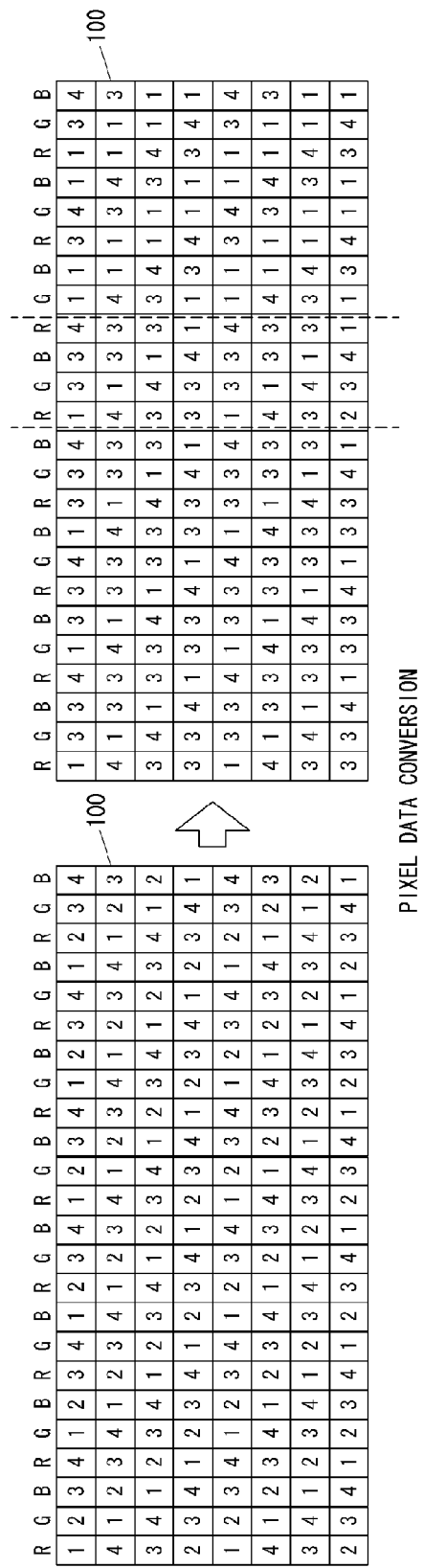
FIG. 16 is an example of a top plan view of a pixel array showing pixel positions of the view image data converted by the view extension method of FIGS. 14 and 15.
Figure 17:
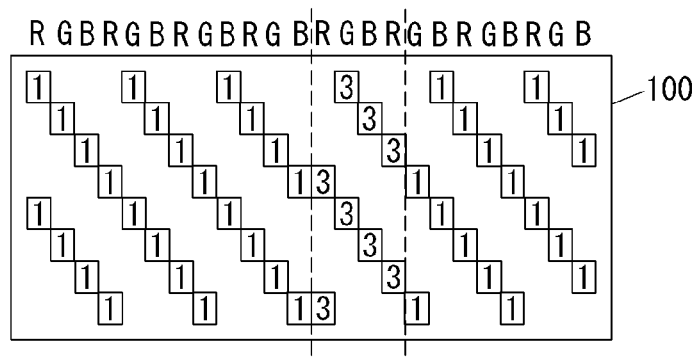
FIG. 17 is an example of a top plan view of a pixel array of pixels seen with the right eye of the viewer and a pixel array of pixels seen with the left eye of the viewer when seeing the pixel array of FIG. 16 from position P2.
Figure 17:
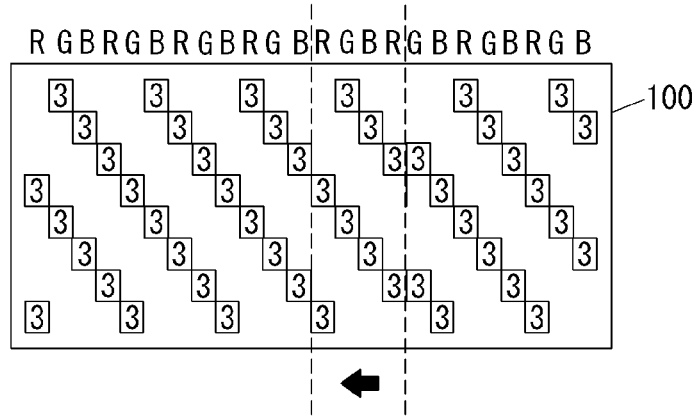

FIG. 13 is an example of a view showing compensation regions of images that can be seen with the right eye and left eye of the viewer when the viewer is at position P2 in accordance with the view extension method of the present invention. FIG. 14 is an example of a view showing both an input image and a converted image, as shown in FIGS. 10a and 10b, in accordance with the view extension method applied when the viewer is at position P2. FIG. 15 shows an example of a view showing a right-eye image and a left-eye image, which are obtained after view image data is converted by the view extension method of FIG. 14, can be perceived by the viewer. FIG. 16 is an example of a top plan view of a pixel array showing pixel positions of the view image data converted by the view extension method of FIGS. 14 and 15. FIG. 17 shows an example of a top plan view of a pixel array of pixels seen with the right eye RE2 of the viewer and a pixel array of pixels seen with the left eye LE2 of the viewer when seeing the pixel array of FIG. 16 from position P2.

When the viewer sees the pixel array from the first and second rear viewing zones 1,2(RE2) and 2,3(LE2) at position P2 as shown in FIG. 9, he or she cannot view a normal stereoscopic image due to severe 3D crosstalk, as shown in FIG. 12B. In the view extension method, as shown in FIGS. 13 to 16, data of the second view image 2 is converted into data of the first view image 1 for the right part of the pixel array PIX, and data of the second view image 2 is converted into data of the third view image 3 for the extended left part of the pixel array PIX. The extended left part is an extended part of the pixel array where the second view image 2 is seen, out of the image perceived from position P2 by the right eye RE2 of the viewer, as shown in FIGS. 12A to 13.

The compensation regions of the images in FIG. 13 are the left part of the image perceived by the right eye RE2 and the right part of the image perceived by the left eye LE2. In the view extension method, the view image data for the left part is converted into the view image data for the right part so that the same view image as seen at the right part of the image perceived by the right eye RE2 is seen at the left part of the image perceived by the right eye RE2. Also, in the view extension method, the view image data for the right part is converted into the view image data for the left part so that the same view image as seen at the left part of the image perceived by the left eye LE2 is seen at the right part of the image perceived by the left eye LE2.

After applying the view extension method as shown in FIGS. 15 and 17, when the viewer views a stereoscopic image from position P2, the viewer sees the first and third view images 1 and 3 separately, by both eyes, and hence feels binocular parallax. In an overlay area of a pixel compensation region seen by the right eye RE2 of the viewer and a pixel compensation region seen by the left eye LE2 of the viewer, as shown in FIG. 13, the viewer sees the third view image in part of the image perceived by the right eye RE2, thereby feeling 3D crosstalk. However, such 3D crosstalk is quite small, as compared to the related art, as is evident by the comparison of FIG. 12B and FIG. 15.

Figure 18:
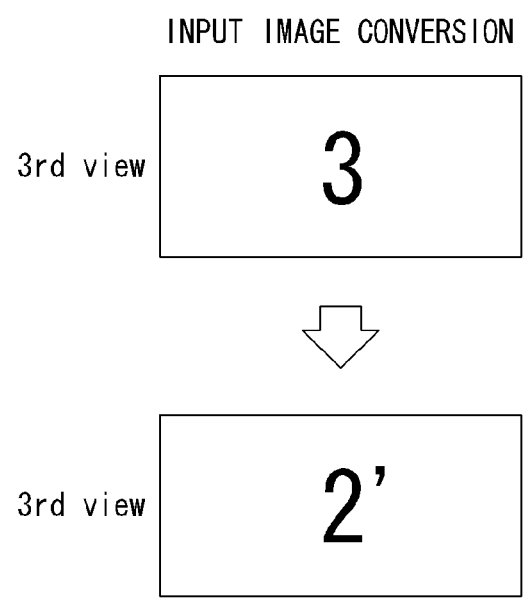
FIG. 18 is a view showing an example of converting either a view image seen with the right eye or a view image seen with the left eye into a commonly perceived view image in accordance with the view maintaining method.
Figure 19:
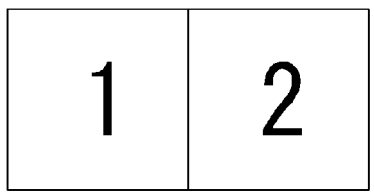
FIG. 19 is an example of a view showing a compensation region of the first converted view image of FIG. 18 in accordance with the view maintaining method.
Figure 19:
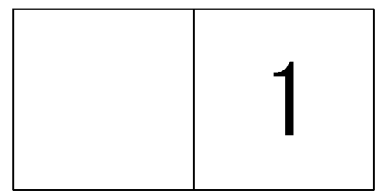
Figure 19:
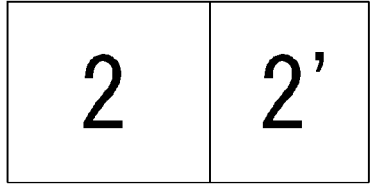
Figure 20:
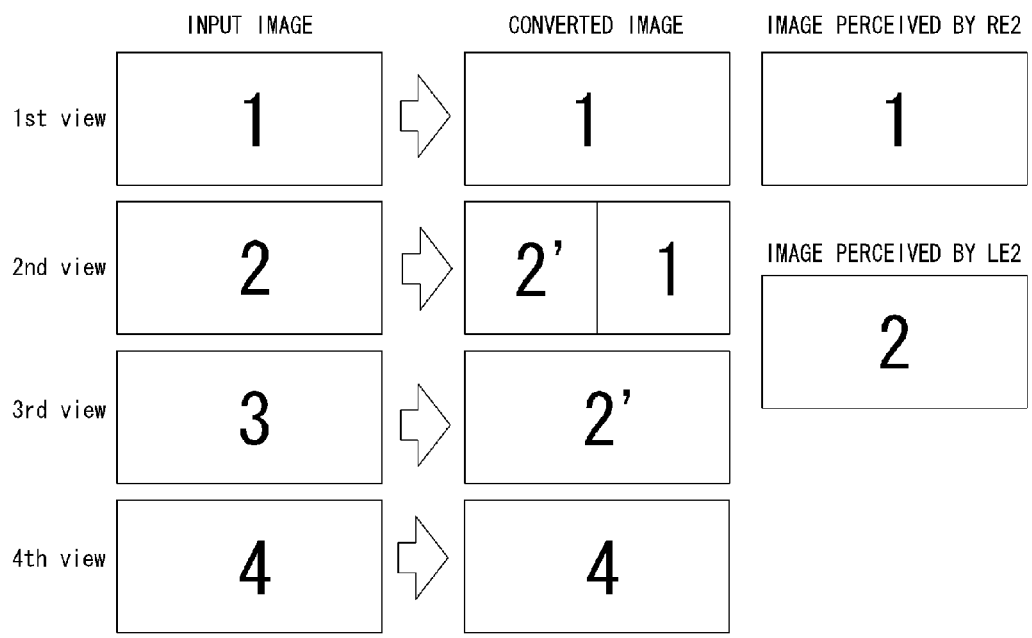
FIG. 20 is an example of a view showing an image converted through an image conversion process of the view maintaining method of FIGS. 18 and 19 and an image perceived by the viewer.
Figure 21:
FIG. 21 is an example of a top plan view of a pixel array showing pixel positions of the view image data converted by the view maintaining method of FIG. 20.
Figure 22:
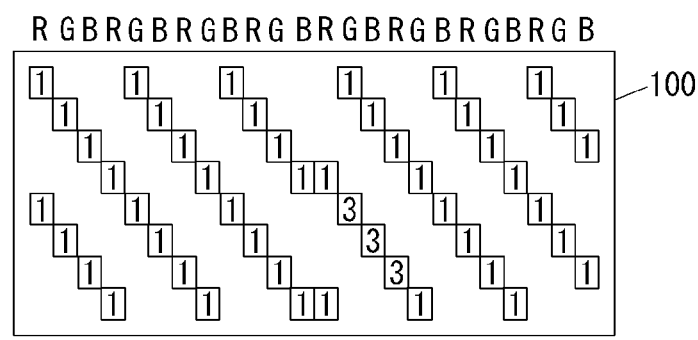
FIG. 22 is an example of a top plan view of a pixel array of pixels seen with the right eye of the viewer and a pixel array of pixels seen with the left eye of the viewer when seeing the pixel array of FIG. 21 from position P2.
Figure 22:
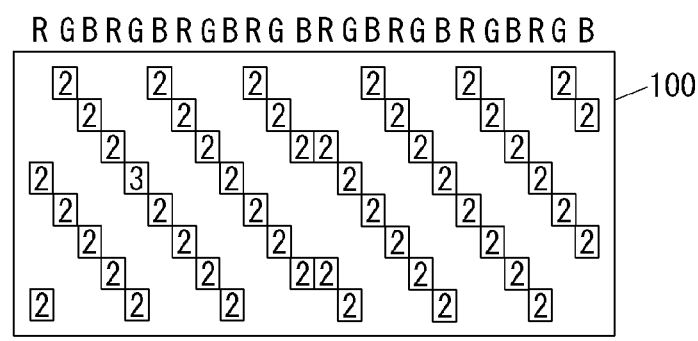

FIG. 18 is a view showing an example of converting either a view image seen with the right eye or a view image seen with the left eye can be converted into a commonly perceived view image. FIG. 19 shows an example of a view showing a compensation region of the first converted view image of FIG. 18 in the view maintaining method. FIG. 20 shows an example of a view showing an image converted through the image conversion process of the view maintaining method of FIGS. 18 and 19, and an image perceived by the viewer. FIG. 21 shows an example of a top plan view of a pixel array showing pixel positions of the view image data converted by the view maintaining method of FIG. 20. FIG. 22 shows a top plan view of a pixel array showing pixels seen with the right eye of the viewer and pixels seen with the left eye of the viewer when seeing the pixel array of FIG. 21 from position P2.

According to the view maintaining method as shown in FIG. 18, when the two neighboring view images, as shown in FIG. 12B, are respectively perceived by the right and left eyes of the viewer, either the view image seen with the right eye or the view image seen with the left eye is converted into commonly perceived view image data and supplied to the display panel 100. For example, the commonly perceived image for the images perceived by the right eye RE2 and the left eye LE2 as shown in FIG. 12B is the second view image 2. In order to convert the image perceived by the left eye LE2 of FIG. 12B into the second view image 2, the third view image 3 is converted into the second view image 2', to firstly convert view image data. When the viewer sees the display panel 100 displaying the first converted image from position P2, as shown in FIG. 18, the image perceived by the right eye RE2 is an image with the first view image 1 on one half and the second view image 2 on the other half, and the image perceived by the left eye LE2 is the second view image 2 and 2', as shown in the left part of FIG. 19. There is a need to convert the second view image 2 seen in the right part of the image perceived by the right eye into the first view image 1, as shown in the right part of FIG. 19, in order to maintain the difference in view between an image perceived by the viewer from position P1 and an image perceived by the viewer from position P2. To this end, data of the second view image 2 displayed in the right part of the display panel 100 is converted into data of the first view image 1, as shown in FIGS. 20 and 21. As a result, the viewer can view a stereoscopic image from positions P1 and P2 without view difference and without 3D crosstalk, as shown in FIGS. 11A and 11B and FIGS. 21 to 23.

In the view maintaining method, view image data can be converted such that the first view image 1 is converted in the second view image 2' in the first conversion process and then the second and third view images 2 and 3 are seen separately by the right eye RE2 and left eye LE2 of the viewer. This method enables the viewer to see a stereoscopic image without view difference even when the viewer has moved leftward or rightward.

Figure 23:
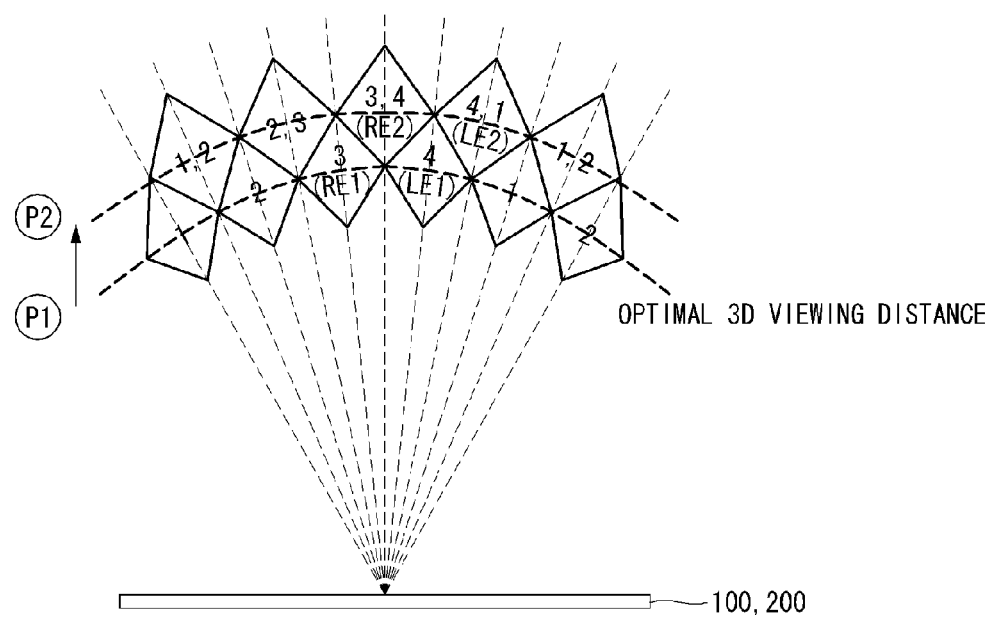
FIG. 23 is a view showing an example of a viewing zone position where the viewer sees a stereoscopic image in pseudo stereoscopic vision.
Figure 24:
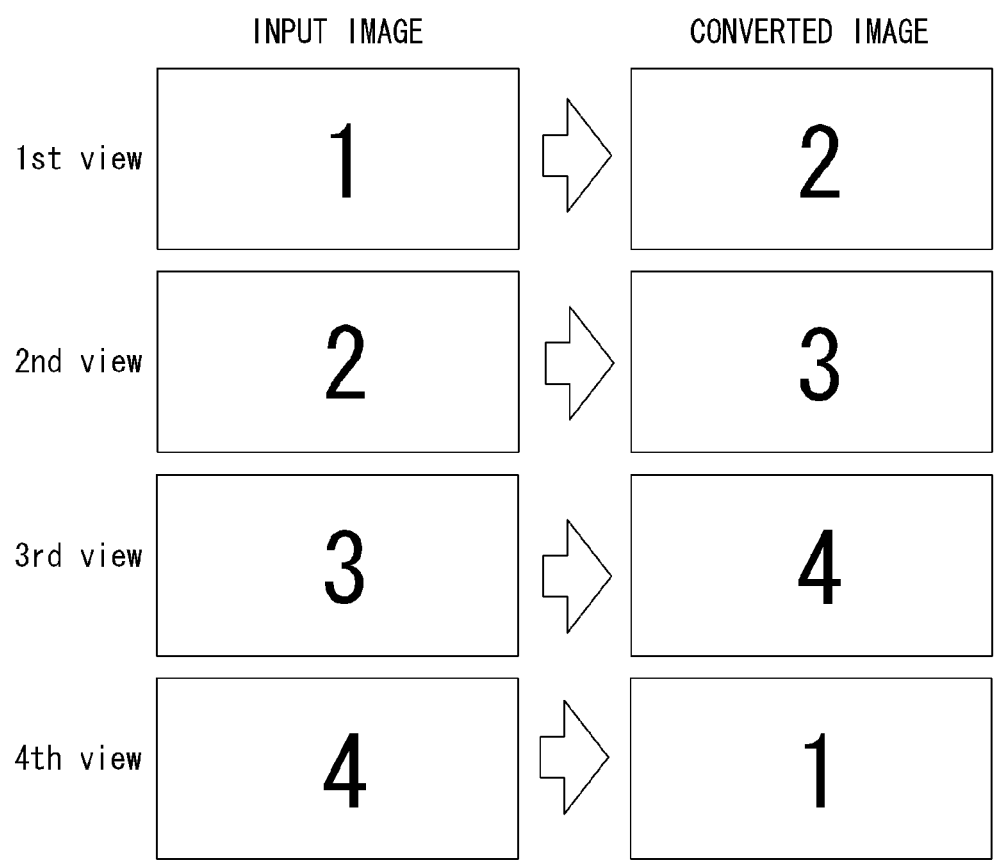
FIG. 24 is a view showing an example of converting view image data so that a stereoscopic image is seen in normal stereoscopic vision from a position where the stereoscopic image is seen in pseudo stereoscopic vision.

The viewer can see a stereoscopic image in pseudo stereoscopic vision according to the relationship between the viewer's position and the viewing zones. The pseudo stereoscopic vision is achieved when the viewer sees the pixels with the left-eye image written therein by the right eye and the pixels with the right-eye image written therein by the left eye. The viewer feels a sense of perspective in pseudo stereoscopic vision, unlike in normal stereoscopic vision, and hence may feel inconvenienced and fatigued when viewing a stereoscopic image in pseudo stereoscopic vision. In the present invention, when the viewer moves to a viewing zone corresponding to a pseudo stereoscopic viewing position, or is located at the pseudo stereoscopic viewing position, multi-view image data written in the display panel 100 is converted in such a manner that view image data seen in viewing zones where the viewer is located is converted into view image data seen in normal stereoscopic vision. In an example, as shown in FIGS. 23 and 24, view image data can be converted by shifting. The view image data can be shifted by two or more phases. When switching from pseudo stereoscopic vision to normal stereoscopic vision by data conversion, the difference in view between the two eyes can be maintained or changed before and after the movement of the viewer. However, it is desirable to maintain the difference in view between the two eyes from a cognitive point of view.

Figure 25:
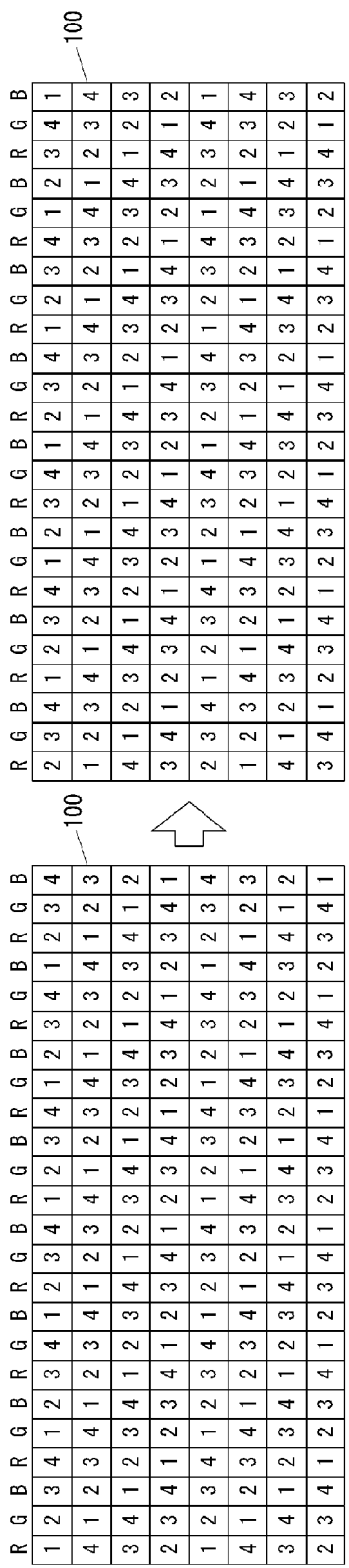
FIG. 25 is an example of a top plan view of a pixel array of pixels in which the input image of FIG. 24 is written and a pixel array of pixels in which the converted view image data of FIG. 24 is written.

FIG. 23 is a view showing an example of a viewing zone position where the viewer sees a stereoscopic image in pseudo stereoscopic vision. FIG. 24 is a view showing an example of converting view image data so that a stereoscopic image is seen in normal stereoscopic vision from a position where the stereoscopic image is seen in pseudo stereoscopic vision. FIG. 25 is an example of a top plan view of a pixel array of pixels in which the input image of FIG. 24 is written and a pixel array of pixels in which the converted view image data of FIG. 24 is written.

As shown in FIG. 23, it is assumed that the viewer has pseudo stereoscopic vision when the right eye RE1 of the viewer is located in a third viewing zone 3(RE1) and the left eye LE1 of the viewer is located in a fourth viewing zone 4(LE1). In this case, a pseudo stereoscopic vision compensation method of the present invention is used to convert view image data by shifting the first view image data 1 into the second view image data 2, the second view image data into the third view image data 2, the third view image data 3 into the fourth view image data 4, and the fourth view image data 4 into the first view image data 1, as shown in FIG. 25. Then, the viewer sees the fourth view image 4 with the right eye RE1 and the first view image 1 with the left eye LE1 in the third and fourth viewing zones 3(RE1) and 4(LE1), thereby appreciating a stereoscopic image in normal stereoscopic vision.

Although the present invention illustrates the above example of converting data perceived in pseudo stereoscopic vision into data perceived in normal stereoscopic vision by shifting on a view-by-view basis, the present invention is not limited thereto. In an example, if the viewing zones where the right eye and left eye of the viewer are located are detected as viewing zones where a stereoscopic image is seen in pseudo stereoscopic vision, each view image data of the multi-view image data can be shifted by I views (I is a positive integer).

The view extension method, the view maintaining method, and the pseudo stereoscopic vision compensation method can be properly selected according to the correlation between the positions of the two eyes of the viewer and the positions of viewing zones. Since the optimal viewing distance from which the viewer can see a stereoscopic image is extended in the present invention, the multi-view autostereoscopic image display in the present invention increases the degree of freedom of design for the back length and the focal length of the lens in image displays. In particular, the multi-view autostereoscopic image display of the present invention is thinner and more lightweight than displays in the related art because the transparent substrate PSUBS of FIG. 1 for securing the back length is thinned or omitted, and therefore the high cost of substrates can be reduced.

Figure 26:
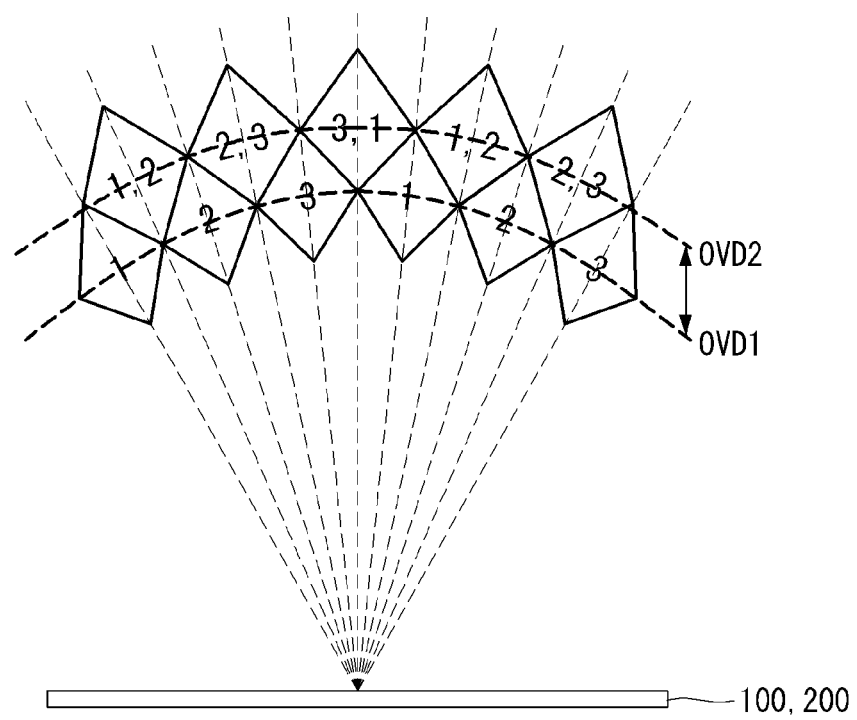
FIG. 26 is an example of a view showing the effect of extending the optimal viewing distance of the multi-view autostereoscopic image display according to the present invention.

As explained above, in the method of controlling optimal viewing distance according to the present invention, the location of the viewing zone for the right eye and left eye of the viewer can be determined, and some view image data of a multi-view image can be converted into different view image data when the viewer's position is shifted. As a result, the method of controlling optimal viewing distance according to the present invention can extend the optimal viewing distance of the multi-view autostereoscopic image display, from which the viewer can properly view a stereoscopic image, to OVD1 and OVD2 as shown in FIG. 26.

As described above, if the viewer is located in rear viewing zones corresponding to position P2, the ratio between view images seen together with the right eye RE2 is different from the ratio between view images seen together with the left eye LE2 because the rear viewing zones are larger in size. To accurately perform the processing of data required to extend the optimal viewing distance, the positions of viewing zones located along the line of an extended optimal viewing distance need to be represented as coordinates and as a ratio.

Figure 27:
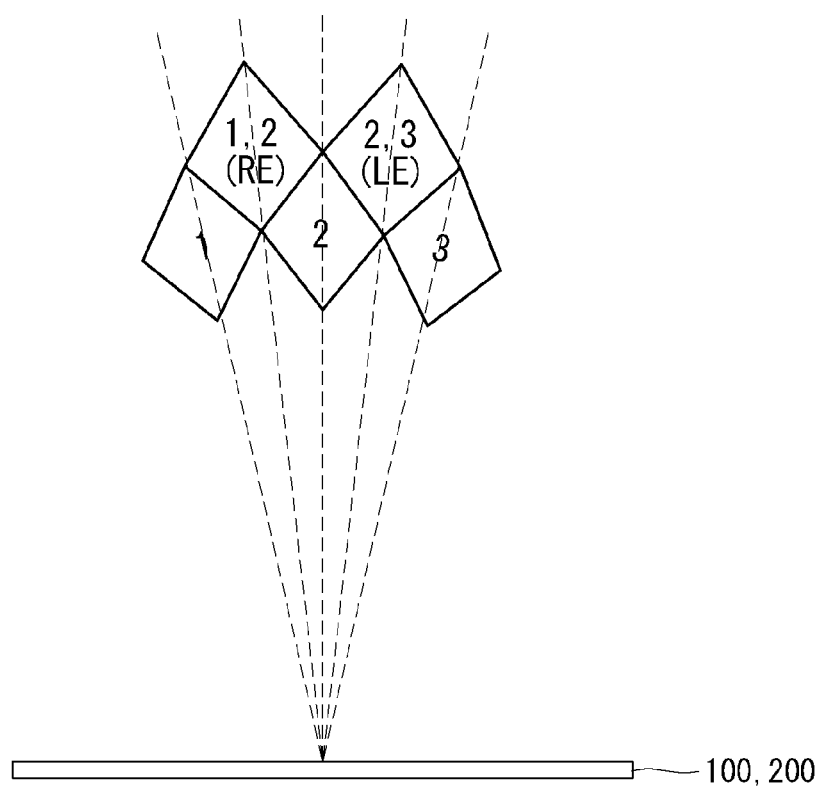
FIGS. 27 to 29 are examples of views showing a method of determining the ratio between view images seen with one eye when the viewer views a stereoscopic image from position P2.
Figure 28:
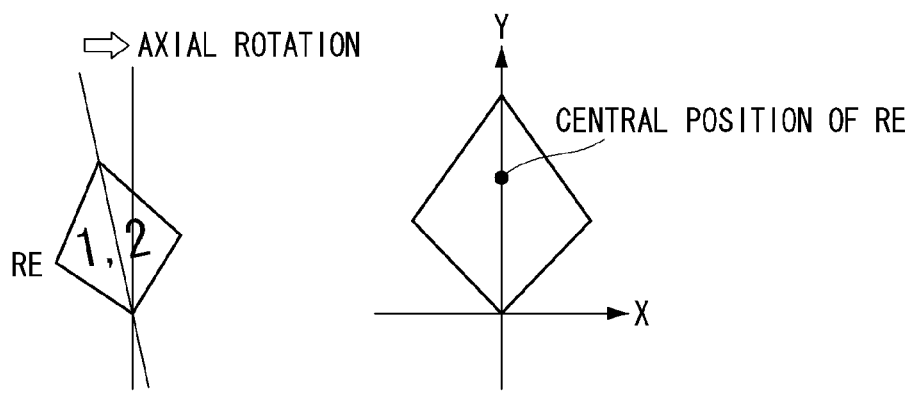
Figure 28:
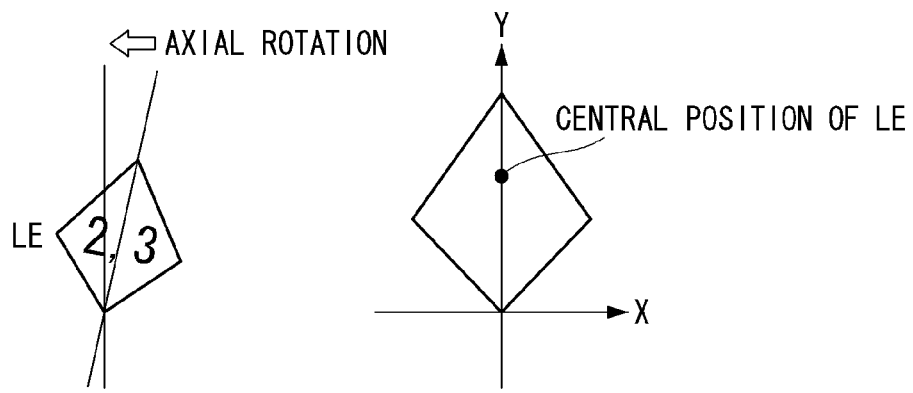

The positions of the viewing zones where the left eye and right eye of the viewer are located can be determined by comparing positional information (coordinates values) of both eyes of the viewer, perceived by the viewing distance sensing unit 114, with viewing zone positional information (coordinate information) stored in the look-up table. As shown in the example of FIG. 27, it is assumed that the viewing zone where the right eye RE of the viewer is located is the first rear viewing zone 1,2(RE) and the viewing zone where the left eye LE of the viewer is located in the second rear viewing zone 3,4(RE). Once the viewing zones where the two eyes of the viewer are located are detected, it is necessary to determine the positions of the right eye RE and left eye LE in the first and second rear viewing zones 1,2(RE) and 2,3(LE), where both eyes of the viewer are located, and determine the ratio between a left-side image and a right-side image seen in the viewing zones 1,2(RE) and 2,3(LE). To this end, in the present invention, a new coordinate system of the viewing zones is established by an axial rotation method shown in FIG. 28, and stored in the look-up table. To generate a coordinate system which makes data processing easier and arithmetic processing simpler, as shown in FIG. 28, a vertex of a diamond-shaped viewing zone, closest to the display panel 100, matches the origin of the X-Y coordinate system, and a vertex thereof, farthest from the display panel 100, is located on the Y axis. A new X-Y coordinate system is generated in advance for each of the viewing zones, and stored, along with existing viewing zone positional information, in the look-up table. The existing viewing zone positional information is referenced to determine which viewing zone the positions of both eyes of the viewer are located, and the positional information of the viewing zones generated based on the new coordinate systems is referenced to define a data conversion area.

In the present invention, Y coordinate values of the right eye RE and left eye LE of the viewer in the viewing zones defined based on the new X-Y coordinate systems are calculated as shown in FIG. 28. Once the Y coordinate values of the right eye RE and left eye LE are determined, the range of an X axial line running through the right eye RE is determined within the viewing zone corresponding to the right eye RE, as shown in the left part of FIG. 29, and the range of an X axial line running through the left eye LE is determined within the viewing zone corresponding to the left eye LE as shown in the right part of FIG. 29. If two view images are seen within one viewing zone, the ratio between the view images input in that viewing zone can be laterally asymmetrical with respect to the viewer's eye, as shown in the right part of FIG. 29. In the example shown in the right part of FIG. 29, the ratio between view images C and D is represented by C:D=Mth View:Nth View.

Figure 29:
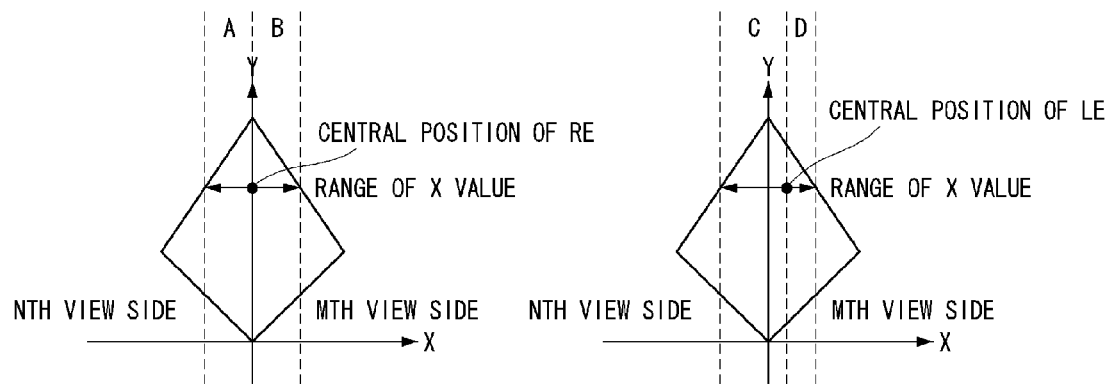

If the viewer's eye is located on the Y axis, as shown in the right part of FIG. 29, the percentage of the Mth view image and the percentage of the Nth view image are 50%, respectively, because the ratio between input images within the viewing zone corresponding to the viewer's eye is represented by A:B=1:1.

As discussed above, in the present invention, at least part of multi-view image data is selectively converted according to the correlation between the positions of the two eyes of the viewer and the positions of viewing zones. As a result, the present invention contributes to extend an optimal viewing distance from which a stereoscopic image can be properly viewed, increase the degree of freedom of design such as the back length, the focal length of the lens, etc to create a design for optimal viewing distance, and allow a substrate for securing back length to be thinned or omitted.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A multi-view autostereoscopic image display comprising: a display panel configured to display multi-view image data; a display panel driver configured to write the multi-view image data; a 3D optical element configured to write the optical axes of the multi-view image data; a 3D optical element driver configured to synchronize with pixel data to be written in a pixel array of the display panel in a 3D mode under control of a viewing distance extension controller and shift the 3D optical element by a predetermined distance every frame period among a plurality of frame periods; a viewing distance sensing unit configured to write the positions of both eyes of a viewer; and the viewing distance extension controller configured to: compare the positions of both eyes of the viewer with positional, size, and shape information of predefined viewing zones stored in a look-up table according to a determined movement direction and movement distance of the viewer based on a change in the positions of the viewing zones where both eyes of the viewer are located, detect, based on the determined movement direction and movement distance of the viewer, viewing zones where both eyes of the viewer are located, provide first, second, and third view image data for at least two rear viewing zones, determine a pixel array including the second view image data and the third view image data in a specific rear viewing zone among the at least two rear viewing zones, selectively convert the second view image into the first view image data for a right part of the pixel array, and convert the second view image data into the third view image data for an extended left part of the pixel array, according to the detected viewing zones based on the determined movement direction and movement distance of the viewer, by generating timing control signals for controlling operation timings of the display panel driver and the 3D optical element driver, and establish, based on a determined ratio, a new coordinate system of the viewing zones, via an axial rotation of the viewing zones, by shifting each view image data of the multi-view image data by I views, where I is a positive integer, and storing the new coordinate system in the look-up table, wherein the operation timings of the display panel driver and the 3D optical element driver are controlled to be synchronized with each other, and the pixel data to be written is shifted in the pixel array and the 3D optical element synchronized with the generated timing control signals, and wherein a difference in view between view images seen in the viewing zones located along a first viewing distance is equal to, or greater than, a difference in view between view images seen in the rear viewing zones located along a second viewing distance.

2. The multi-view autostereoscopic image display of claim 1, wherein, if it is determined that a stereoscopic image is not properly viewed, the viewing distance extension controller converts at least some of the multi-view image data into different view image data, and
   if it is determined that the viewer is located in a viewing zone corresponding to a pseudo stereoscopic viewing position, the viewing distance extension controller converts at least some of the multi-view image data into view image data seen in normal stereoscopic vision.

3. The multi-view autostereoscopic image display of claim 1, wherein the difference in view between view images seen in the viewing zones located along the first viewing distance is greater than the difference in view between view images seen in the viewing zones located along the second viewing distance.

4. The multi-view autostereoscopic image display of claim 3, wherein, when a first view image and a second view image are seen by a right eye of the viewer in a first viewing zone, and the second view image and a third view image are seen by a left eye of the viewer in a second viewing zone,
   the viewing distance extension controller converts:
      second view image data in the first viewing zone into first view image data, and
      second view image data in the second viewing zone into third view image data.

5. The multi-view autostereoscopic image display of claim 1, wherein the difference in view between view images seen in the viewing zones located along the first viewing distance is equal to the difference in view between view images seen in the viewing zones located along the second viewing distance.

6. The multi-view autostereoscopic image display of claim 5, wherein the viewing distance extension controller converts either a view image perceived by a right eye or a view image perceived by a left eye into view image data commonly seen in a right-eye view image and a left-eye view image.

7. The multi-view autostereoscopic image display of claim 6, wherein, when a first view image and a second view image are seen by the right eye of the viewer in a first viewing zone, and the second view image and a third view image are seen by the left eye of the viewer in a second viewing zone,
   the viewing distance extension controller converts third view image data into second view image data, and then converts the second view image data into first view image data.

8. The multi-view autostereoscopic image display of claim 1, wherein, if it is determined that the viewer is located in a viewing zone corresponding to a pseudo stereoscopic viewing position, the viewing distance extension controller converts at least some of the multi-view image data into view image data seen in normal stereoscopic vision.

9. A method of controlling an optimal viewing distance of a multi-view autostereoscopic image display including a display panel for displaying multi-view image data, a display panel driver for writing the multi-view image data, a 3D optical element for separating the optical axes of the multi-view image data, and a 3D optical element driver for synchronizing with pixel data to be written in a pixel array of the display panel in a 3D mode under control of a viewing distance extension controller and shifting the 3D optical element by a predetermined distance every frame period among a plurality of frame periods, the method comprising: sensing the positions of both eyes of a viewer; comparing the positions of both eyes of the viewer with positional, size, and shape information of predefined viewing zones stored in a look-up table according to a determined movement direction and movement distance of the viewer based on a change in the positions of the viewing zones where both eyes of the viewer are located; detecting, based on the determined movement direction and movement distance of the viewer, viewing zones where both eyes of the viewer are located; providing first, second, and third view image data for at least two rear viewing zones, determining a pixel array including the second view image data and the third view image data in a specific rear viewing zone among the at least two rear viewing zones; selectively converting the second view image into the first view image data for a right part of the pixel array, and converting the second view image data into the third view image data for an extended left part of the pixel array, according to the detected viewing zones based on the determined movement direction and movement distance of the viewer, by generating timing control signals for controlling operation timings of the display panel driver and the 3D optical element driver; and establishing, based on a determined ratio, a new coordinate system of the viewing zones, via an axial rotation of the viewing zones, by shifting each view image data of the multi-view image data by I views, where I is a positive integer, and storing the new coordinate system in the look-up table, wherein the operation timings of the display panel driver and the 3D optical element driver are controlled to be synchronized with each other, and the pixel data to be written is shifted in the pixel array and the 3D optical element synchronized with the generated timing control signals, and wherein a difference in view between view images seen in the viewing zones located along a first viewing distance is equal to, or greater than, a difference in view between view images seen in the rear viewing zones located along a second viewing distance.

10. The method of claim 9, wherein the selectively converting includes:
   if it is determined that a stereoscopic image is not properly viewed in the viewing zones where both eyes of the viewer are located, converting at least some of the multi-view image data into different view image data, and
   if it is determined that the viewer is located in a viewing zone corresponding to a pseudo stereoscopic viewing position, converting at least some of the multi-view image data into view image data seen in normal stereoscopic vision.

11. The method of claim 9, wherein, the selectively converting further includes:
   converting at least some of the multi-view image data into different view image data such that the difference in view between view images seen in the viewing zones located along the first viewing distance is greater than the difference in view between view images seen in the viewing zones located along the second viewing distance.

12. The method of claim 11, wherein the selectively converting further includes:
   when a first view image and a second view image are seen by a right eye of the viewer in a first viewing zone, and the second view image and a third view image are seen by a left eye of the viewer in a second viewing zone, converting:
      second view image data in the first viewing zone into first view image data, and
      second view image data in the second viewing zone into third view image data.

13. The method of claim 9, wherein the selectively converting further includes:
   converting at least some of the multi-view image data into different view image data such that the difference in view between view images seen in the viewing zones located along the first viewing distance is equal to the difference in view between view images seen in the viewing zones located along the second viewing distance.

14. The method of claim 13, wherein the selectively converting further includes:
   converting either a view image perceived by a right eye or an image perceived by a left eye into view image data commonly seen in a right-eye view image and a left-eye view image.

15. The method of claim 14, wherein the selectively converting further includes:
   when a first view image and a second view image are seen by the right eye of the viewer in a first viewing zone, and the second view image and a third view image are seen by the left eye of the viewer in a second viewing zone,
   converting:
      third view in data to be supplied to the display panel into second view image data, and
      the second view image data into first view image data.

16. The method of claim 9, wherein the selectively converting includes:
   if it is determined that the viewer is located in a viewing zone corresponding to a pseudo stereoscopic viewing position, converting at least some of the multi-view image data into view image data seen in normal stereoscopic vision.

* * * * *